US008125473B2

(12) United States Patent
Chung et al.

(10) Patent No.: US 8,125,473 B2
(45) Date of Patent: Feb. 28, 2012

(54) ELECTRO-LUMINESCENCE DISPLAY DEVICE

(75) Inventors: Hoon Ju Chung, Pyungtack-shi (KR); Chang Hoon Jeon, Kumi-shi (KR)

(73) Assignee: LG Display Co., Ltd., Seoul (KR)

( * ) Notice: Subject to any disclaimer, the term of this patent is extended or adjusted under 35 U.S.C. 154(b) by 511 days.

(21) Appl. No.: 12/385,971

(22) Filed: Apr. 24, 2009

(65) Prior Publication Data

US 2009/0207107 A1 Aug. 20, 2009

Related U.S. Application Data

(62) Division of application No. 11/022,826, filed on Dec. 28, 2004, now Pat. No. 7,538,749.

(30) Foreign Application Priority Data

Apr. 29, 2004 (KR) ........................ 10-2004-0029867

(51) Int. Cl.
*G09G 5/00* (2006.01)
*G06F 3/038* (2006.01)

(52) U.S. Cl. .......................................... 345/207; 345/77

(58) Field of Classification Search .................. 345/207, 345/76, 77, 82, 83
See application file for complete search history.

(56) References Cited

U.S. PATENT DOCUMENTS

| | | | |
|---|---|---|---|
| 6,479,940 | B1 | 11/2002 | Ishizuka |
| 6,995,753 | B2 | 2/2006 | Yamazaki et al. |
| 7,221,338 | B2 | 5/2007 | Yamazaki et al. |

FOREIGN PATENT DOCUMENTS

| | | |
|---|---|---|
| CN | 1246950 | 3/2000 |
| CN | 1306312 | 8/2001 |
| CN | 1397924 | 2/2003 |
| JP | 04-336501 | 11/1992 |
| JP | 2001-282190 | 10/2001 |
| JP | 2002-62856 | 2/2002 |
| JP | 2003-029724 | 1/2003 |
| JP | 2004-184664 | 7/2004 |
| WO | WO 99/48339 | 9/1999 |

*Primary Examiner* — Kevin M Nguyen
(74) *Attorney, Agent, or Firm* — McKenna Long & Aldridge, LLP

(57) ABSTRACT

An electro-luminescence display device and a method of driving the same for controlling a full white brightness depending upon a brightness of the external environment and thus controlling a brightness mode is disclosed. An electro-luminescence display device according to the present invention comprising: a display panel having pixels light-emitted by a supplied current; a data driver for applying a data voltage corresponding to said current to the pixels; and a timing controller for dividing one frame into a plurality of sub-frames and applying said data voltage corresponding to each of the plurality of sub-frames to the data driver and for controlling an emission time of each frame.

15 Claims, 11 Drawing Sheets

ELECTRO-LUMINESCENCE DISPLAY DEVICE

CROSS-REFERENCE TO RELATED APPLICATIONS

This application is a Divisional of application Ser. No. 11/022,826 filed Dec. 28, 2004, now U.S. Pat. No. 7,538,749; which claims priority to Korean Patent Application No. 10-2004-0029867, filed Apr. 29, 2004 all of which are hereby incorporated by reference for all purposes as if fully set forth herein.

BACKGROUND OF THE INVENTION

1. Field of the Invention

This invention relates to an electro-luminescence display, and more particularly to an electro-luminescence display device and a method of driving the same wherein a brightness of full white is controlled depending upon a brightness of external environment, thereby controlling a brightness mode.

2. Discussion of the Related Art

An electro-luminescence (EL) display is a self-luminous device in which a phosphorous material emits light by recombination of electrons and holes. The EL display is largely classified into an inorganic EL display device and an organic EL display device, depending upon its material and structure. The EL display has the same advantage as cathode ray tubes (CRT) in that it has a faster response speed than passive-type light-emitting devices such as liquid crystal displays (LCD), which require a separate light source.

FIG. 1 is a sectional view illustrating a general structure of an organic EL device for explaining a light-emitting principle of the EL display device. Referring to FIG. 1, an organic EL display device includes an electron injection layer 4, an electron carrier layer 6, a light-emitting layer 8, a hole carrier layer 10 and a hole injection layer 12 that are sequentially disposed between a cathode 2 and an anode 14. When a voltage is applied between a transparent electrode, that is, the anode 14 and a metal electrode, that is, the cathode 2, then electrons produced from the cathode 2 are injected, via the electron injection layer 4 and the electron carrier layer 6, into the light-emitting layer 8, while holes produced from the anode 14 are injected, via the hole injection layer 12 and the hole carrier layer 10, into the light-emitting layer 8. Thus, the electrons and the holes fed from the electron carrier layer 6 and the hole carrier layer 10, respectively, are collided and recombined at the light-emitting layer 8 to generate light. Then, this light is emitted, via the transparent electrode (i.e., the anode 14), into the exterior to thereby display a picture.

Such an EL display device employs either a surface-area divisional driving method or a time divisional driving method to express gray levels. The surface-area divisional driving method expresses a gray level by dividing one pixel into a plurality of sub-pixels, each of which is independently driven in accordance with a digital data signal. However, such a surface-area divisional driving method has a problem in that the pixel structure becomes complicated. On the other hand, the time divisional driving method expresses a gray level by controlling a light-emission time of pixels. In other words, it divides one frame into a plurality of sub-frames to display a gray level, and each sub-frame interval is further divided into an emission time and a non-emission time. Thus, a gray level of a pixel is expressed by summing the emission time of each sub-frame within one frame interval. Because EL display devices have a faster response speed than LCD devices, the time divisional driving method is generally employed.

FIG. 2 illustrates a time divisional driving method employed to drive an EL display device according to a related art. Referring to FIG. 2, the time divisional driving method divides each frame into a plurality of sub-frames SF corresponding to each bit of a digital video signal for gray level expression. In FIG. 2, a 12-bit digital data signal is used to express 256 gray levels, and one frame is divided into 12 sub-frames SF1 to SF12 in such a manner to correspond to the 12-bit digital data signal. The first sub-frame SF1 of the 12 sub-frames SF1 to SF12 corresponds to the least significant bit of the digital data signal, while the 12th sub-frame SF12 thereof corresponds to the most significant bit of the digital data signal.

Each of the 12 sub-frames SF1 to SF12 is divided into an emission time of LT1 to LT12 and a non-emission time of UT1 to UT12. In this case, the emission time LT1 to LT12 of each sub-frame SF1 to SF12 can use either a binary code having a ratio of 1:2:4:8:16:32: . . . or a non-binary code such as 1:2:4:6:10:14:19: . . . for expressing $2^8$ (i.e., 256) gray levels using a 12-bit digital data signal.

During each sub-frame (SF1 to SF12) interval, the EL display device sequentially scans the entire pixels in a vertical direction, that is, in a direction from the upper portion of the EL panel to the lower portion thereof for its light-emission. Thus, the emission time LT1 to LT12 of each sub-frame (SF1 to SF12) interval follows the oblique line shown in FIG. 2 within each sub-frame SF1 to SF12. All the emission times within each sub-frame SF1 to SF12 are summed during one frame interval to thereby express a gray level of a desired picture.

Because such a time divisional driving method according to the related art expresses a desired gray level by summing the emission time LT1 to LT12 of each sub-frame SF1 to SF12 during one frame interval, a full white brightness of the EL display device is fixed, when displaying pictures, irrespective of where the EL display is, that is, a brightness of the external environment. Therefore, the related art EL display device driven by the time divisional driving method has a problem of large power consumption.

SUMMARY OF THE INVENTION

Accordingly, the present invention is directed to an electro-luminescence display device and a method of driving the same that substantially obviate one or more of the problems due to limitations and disadvantages of the related art.

An advantage of the present invention is to provide an electro-luminescence display device and a method of driving the same wherein a brightness of full white is controlled depending upon a brightness of an external environment, thereby controlling a brightness mode.

Another advantage of the present invention is to provide an electro-luminescence display device capable of reducing power consumption.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other advantages of the invention, an electro-luminescence display device and a method of driving the same according to an embodiment of the present invention includes a display panel having pixels light-emitted by a supplied current; a data driver for applying a data voltage corresponding to said current to the pixels; and a timing controller for dividing one frame into a plurality of sub-frames and applying said data voltage corresponding to each of the plurality of sub-frames to the data driver and for controlling an emission time of each frame.

The timing controller controls the number of sub-frames depending upon at least one of brightness of an external environment of the display panel and a selection of a user.

The electro-luminescence display device further includes a photo sensor for detecting said brightness of the external environment of the display panel.

Each of the pixels includes a pixel of a digital driving system in which a digital data signal is supplied.

Each of the pixels includes a data line supplied with said data voltage; a display gate line supplied with a gate pulse; a non-display gate line supplied with an erasure pulse; a light-emitting cell connected between a supply voltage source and a ground voltage source; a driving switch connected between the supply voltage source and the light-emitting cell; a first switching device connected to the data line, the display gate line and the driving switch; a second switching device connected to a first node positioned between the driving switch and the first switching device, the non-display gate line and the supply voltage source; and a storage capacitor connected between the first node and the supply voltage source.

The timing controller includes a selection signal generator for generating a selection signal in response to a brightness signal detected from the light sensor; a first data converter for converting N-bit data (wherein N is an integer) inputted from the exterior thereof into M-bit data (wherein M is an integer larger than N); a second converter for converting said N-bit data inputted from the exterior thereof into a data having less than (M-K) bits (wherein k is an integer smaller than M) of said N bits; and a selector for selectively applying said N-bit data to the first and second converters in response to said selection signal.

Herein, the selection signal generator generates a first logical state of selection signal when said brightness of the external environment of the display panel is relatively high while generating a second logical state of selection signal when said brightness of the external environment of the display panel is relatively low.

The selection signal generator applies said N-bit data to the first data converter in response to said first logical state of selection signal while applying said N-bit data to the second data converter in response to said second logical state of selection signal.

Each of the first and second data converters converts said N-bit data into said M-bit data in such a manner to have any one of a binary code and a non-binary code.

A gray level value corresponding to said M-bit data converted by the first data converter is larger than a gray level value corresponding to said M-bit data converted by the second data converter.

Each of the plurality of sub-frames has a light-emission time corresponding to each bit of said M-bit data.

The second data converter converts said N-bit data into a data having less than K bits, and sets (M-K) bits of M most significant bits to a value of '0'.

The timing controller divides one frame into a plurality of sub-frames having the emission time and a non-emission time and controls the emission time of each of the sub-frames.

Each of the pixels includes a pixel of a digital driving system in which a digital data signal is supplied.

In the electro-luminescence display device, each of the pixels includes a data line supplied with said data voltage; a display gate line supplied with a gate pulse; a non-display gate line supplied with an erasure pulse; a light-emitting cell connected between a supply voltage source and a ground voltage source; a driving switch connected between the supply voltage source and the light-emitting cell; a first switching device connected to the data line, the display gate line and the driving switch; a second switching device connected to a first node positioned between the driving switch and the first switching device, the non-display gate line and the supply voltage source; and a storage capacitor connected between the first node and the supply voltage source.

The electro-luminescence display device further includes a photo sensor for detecting said brightness of the external environment of the display panel; and a gate driver for sequentially applying said gate pulse to the display gate lines and for sequentially applying said erasure pulse to the non-display gate lines.

The timing controller includes a selection signal generator for generating a selection signal in response to a brightness signal detected from the light sensor; a data converter for converting N-bit data (wherein N is an integer) inputted from the exterior thereof into M-bit data (wherein M is an integer larger than N); and a control signal generator for applying a gate control signal for reducing said emission time to the gate driver in response to said selection signal.

Herein, the selection signal generator generates a first logical state of selection signal when said brightness of the external environment of the display panel is relatively high while generating a second logical state of selection signal when said brightness of the external environment of the display panel is relatively low.

The control signal generator applies a first gate signal for allowing an emission time of each of the plurality of sub-frames to correspond to each bit of said M-bit data to the gate driver in response to said first logical state of selection signal, and applies a second gate control signal for allowing said emission time of each of the plurality of sub-frames corresponding to each bit of said M-bit data to be reduced to the gate driver in response to said second logical state of selection signal.

The gate driver applies said erasure pulse to the non-display gate lines such that said emission time of each of the plurality of sub-frames corresponds to each bit of said N-bit data, after applying said gate pulse to the display gate lines on a basis of said first gate signal.

The gate driver applies said erasure pulse to the non-display gate lines such that said emission time of each of the plurality of sub-frames is reduced, after applying said gate pulse to the display gate lines on a basis of said second gate signal.

Herein, each of said emission time reduced at each of the plurality of sub-frames is reduced at a ratio of J (wherein J is an integer) with respect to each emission time of each of the plurality of sub-frames corresponding to each bit of said M-bit data.

The data converter converts said N-bit data into said M-bit data in such a manner to have any one of a binary code and a non-binary code.

In order to achieve these and other advantages of the invention, a method of driving an electro-luminescence display device including a display panel having pixels light-emitted by a supplied current and a data driver for applying a data voltage corresponding to said current to the pixels comprises steps of dividing one frame into a plurality of sub-frames; applying said data voltage corresponding to each of the plurality of sub-frames to the data driver; and controlling an emission time of each frame.

The step of controlling an emission time of each frame includes controlling the number of the sub-frames included in each frame.

The step of controlling an emission time of each frame includes controlling the number of sub-frames included in each frame depending upon at least one of brightness of an external environment of the display panel and a selection of a user.

The step of controlling an emission time of each frame includes dividing one frame into a plurality of sub-frames having the emission time and a non-emission time and controlling the emission time of each of the sub-frames.

In another aspect of the present invention, a flat panel display device includes a display panel having a plurality of pixels; a photo sensor detecting a brightness of the external environment of the display panel; a timing controller receiving N-bit video signals (wherein N is an integer) and the detected brightness and dividing one frame into a plurality of sub-frames, the timing controller modulating the N-bit video signals in response to the detected brightness and the number of the sub-frames; and a data driver receiving the modulated N-bit video signals from the timing controller and applying data voltages corresponding to the modulated N-bit video signals to the pixels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 3:
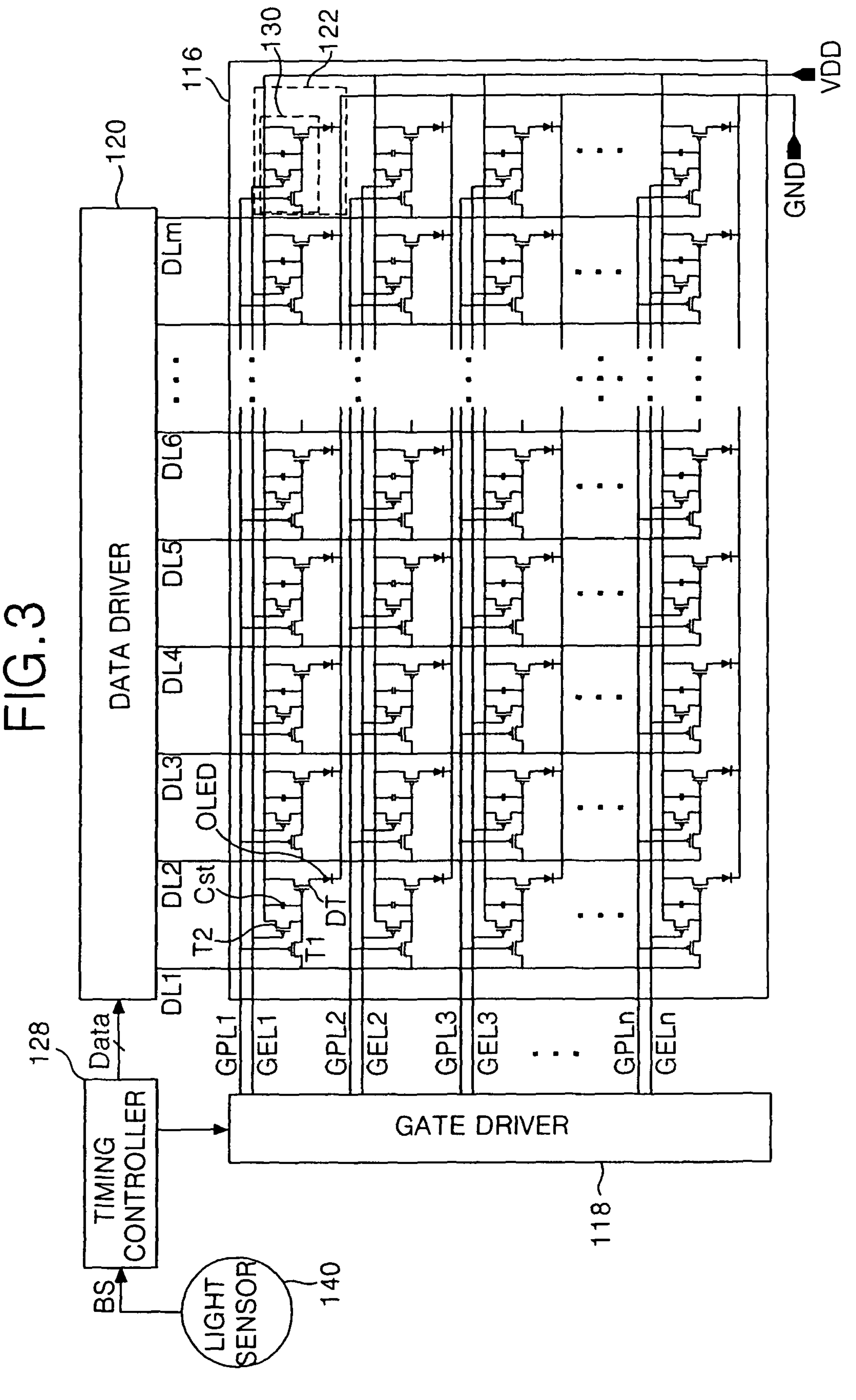
FIG. 3 is a block diagram illustrating a configuration of an electro-luminescence display device according to a first embodiment of the present invention.

Referring to FIG. 3, an electro-luminescence (EL) display device according to a first embodiment of the present invention includes an EL panel 116 having pixels 122 arranged at intersections among display gate lines GPL1 to GPLn and non-display gate lines GEL1 to GELn and data lines DL1 to DLm, a gate driver 118 for driving the display gate lines GPL1 to GPLn and the non-display gate lines GEL1 to GELn, a data driver 120 for driving the data lines DL1 to DLm, a photo sensor 140 for detecting a brightness of the external environment of the EL display panel 116, and a timing controller 128 for controlling a driving timing of the data driver 120 and the gate driver 118 and for applying a digital data Data to the data driver 120 in response to a brightness signal from the photo sensor 140.

Figure 4:
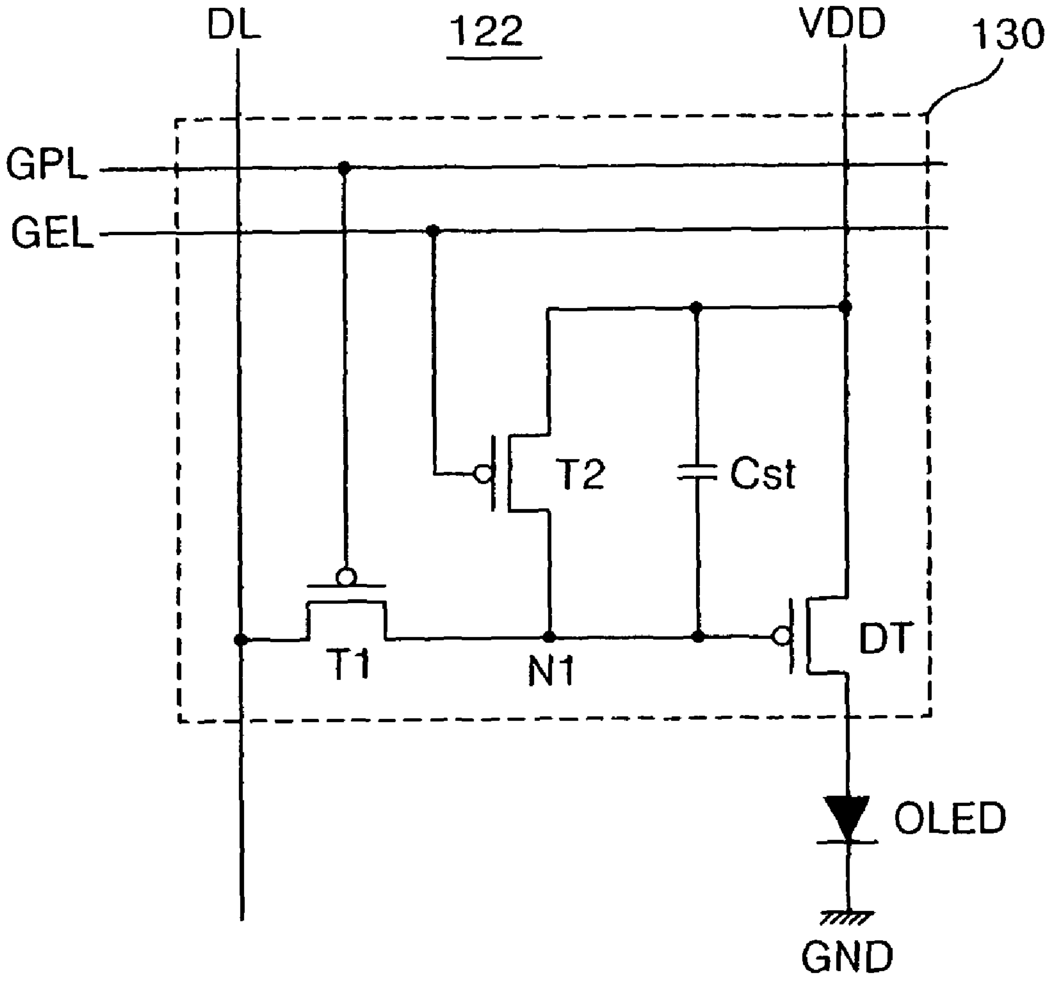
FIG. 4 is a circuit diagram of the pixel shown in FIG. 3.

Referring to FIG. 4, each pixel 122 includes a supply voltage source VDD, a ground voltage source GND, a light-emitting cell OELD connected between the supply voltage source VDD and the ground voltage source GND, and a light-emitting cell driving circuit 130 for driving the light-emitting cell OLED in response to a driving signal from each of the display gate line GPL and the non-display gate line GEL.

The light-emitting cell driving circuit 130 includes a driving thin film transistor (TFT) DT connected between the supply voltage source VDD and the light-emitting cell OELD, a first switching TFT T1 connected to the data electrode line DL, the display gate line GPL and the driving TFT DT, a second switching TFT T2 connected to a first node N1 positioned between the first switching TFT T1 and the supply voltage source VDD, and a storage capacitor Cst connected between the first node N1 and the supply voltage source VDD. Herein, the TFTs may be, for example, a p-type electron metal-oxide semiconductor field effect transistor (MOSFET). A gate terminal of the driving TFT DT is connected to the drain terminal of the first switching TFT T1; a source terminal thereof is connected to the supply voltage source VDD; and a drain terminal thereof is connected to the light-emitting cell OLED. A gate terminal of the first switching TFT T1 is connected to the display gate line GPL; a source terminal thereof is connected to the data line DL; and a drain terminal thereof is connected to the gate terminal of the driving TFT DT. A gate terminal of the second switching TFT T2 is connected to the non-display gate line GEL; a source terminal thereof is connected to the supply voltage source VDD; and a drain terminal thereof is connected to the first node N1. The storage capacitor Cst stores a data voltage at the first node N1 when the first switching TFT T1 is an ON-state, and thereafter maintains an ON-state of the driving TFT DT even when the first switching TFT T1 is turned off until a data voltage of the next frame is supplied.

In operation, when a gate pulse is inputted to the display gate lines GPL1 to GPLn, then the first switching TFT T1 is turned on, which then turns on the driving TFT DT. Then, the light-emitting cell OLED emits light in accordance with a data voltage inputted via the data line DL. After the first switching TFT T1 was turned off by the gate pulse inputted to the display gate lines GPL1 to GPLn, and when an erasure pulse is inputted to the non-display gate lines GEL1 to GELn, the second switching TFT T2 is turned on, which then discharges a data voltage stored in the storage capacitor Cst. At this time, the light-emitting cell OLED emits light until the data voltage stored in the storage capacitor Cst is discharged.

The photo sensor 140 detects a brightness of the external environment of the EL display panel 116, and applies a brightness signal BS corresponding to the brightness of the external environment to the timing controller 128.

Figure 5:
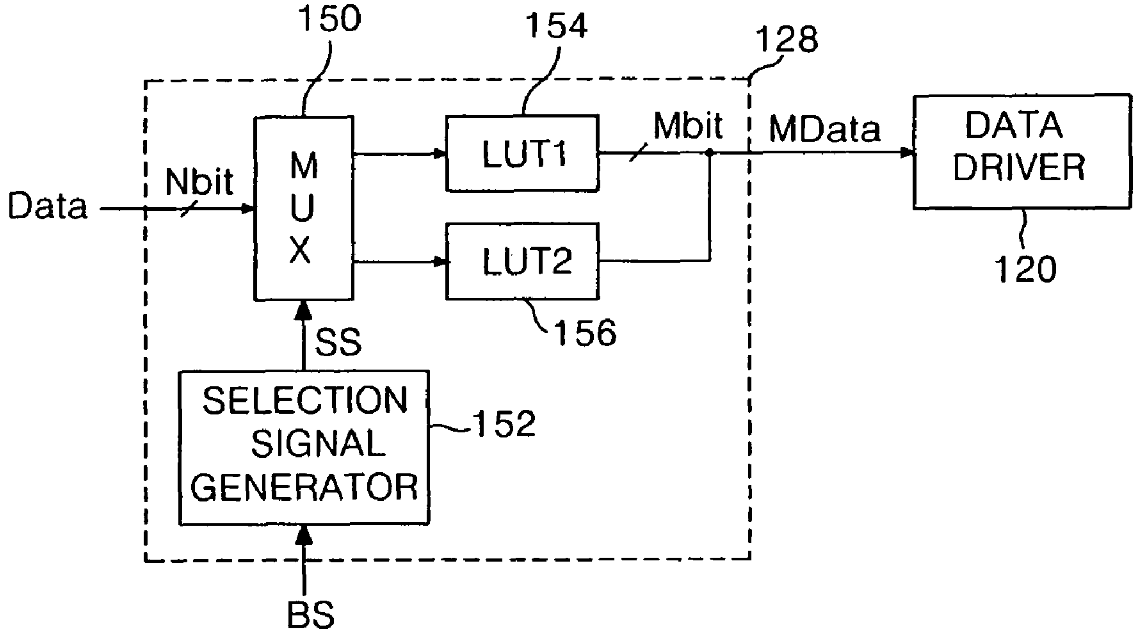
FIG. 5 is a block diagram of the timing controller shown in FIG. 3.

The timing controller 128 generates a data control signal for controlling the data driver 120 and a gate control signal for controlling the gate driver 118 using synchronizing signals supplied from an external system (e.g. a graphic card). Further, the timing controller 128 applies a digital data Data from the external system to the data driver 120. At this time, the timing controller 128 modulates the digital data Data in response to a brightness signal BS from the photo sensor 140 and applies the modulated digital data to the data driver 120. To this end, as shown in FIG. 5, the timing controller 128 includes a selection signal generator 152 for generating a selection signal SS on the basis of the brightness signal BS from the photo sensor 140, a first look-up table (LUT 1) 154 for converting an N-bit digital data Data inputted from the exterior thereof into an M-bit digital data MData (wherein M is an integer larger than N) in a high brightness mode, a second look-up table (LUT 2) 156 for converting an N-bit digital data Data into a M-bit digital data MData in a low brightness mode, and a multiplexer 150 for selectively applying the N-bit digital data Data from the exterior thereof to the first and second LUT's 154 and 156 in response to the selection signal SS from the selection signal generator 152. For the low brightness mode, although the second look-up table (LUT 2) converts the N-bit digital data Data into a M-bit digital data MData, only K bits in the M bits are used to express gray levels (wherein K is an integer and smaller than M). For the sake of explanation, it is assumed in this embodiment that the N-bit data is a 6-bit data and the M-bit data is a 12-bit data.

Still referring to FIG. 5, the selection signal generator 152 applies a first logical state of the selection signal SS to the multiplexer 150 when the brightness signal BS from the photo sensor 140 is greater than a reference value, while applying a second logical state of the selection signal SS to the multiplexer 150 when the brightness signal BS from the photo sensor 140 is less than the reference value. In this case, the first logical state of the selection signal SS is generated when a brightness of the external environment of the EL display panel 116 is relatively high, whereas the second logical state of the selection signal SS is generated when a brightness of the external environment of the EL display panel 116 is relatively low. The multiplexer 150 applies a N-bit digital data Data supplied from the exterior thereof to the first look-up table (LUT 1) 154 in response to the first logical state of the selection signal SS from the selection signal generator 152, while applying a N-bit digital data Data to the second look-up table (LUT 2) 156 in response to the second logical state of the selection signal SS from the selection signal generator 152.

For example, the first look-up table (LUT 1) 154 converts the 6-bit digital data Data supplied from the multiplexer 150 into a 12-bit digital data MData having a 256 gray level information, and applies the converted digital data to the data driver 120 so as to make a gamma control as indicated by the following table:

TABLE 1

| 6-bit Digital Data (Data)-Binary Code | 12-bit Modulated Data (Mdata)-Non-binary Code |
|---|---|
| (63)111111 | 255(111111111111) |
| (62)111110 | 254(111111111110) |
| (61)111101 | 253(111111111101) |
| (60)111100 | 252(111111111100) |
| (59)111011 | 251(111111111011) |
| . | . |
| . | . |
| . | . |

Herein, the 12 bits in the first look-up table (LUT 1) 154 have a non-binary code or a weighting value of a binary code. The embodiments of the present invention will be described with an example of the binary code. For instance, a weighting value corresponding to each bit of the 12 bits has a ratio of 1:2:4:6:10:14:19:26:33:40:47:53. Accordingly, the 12-bit digital data MData converted by the first look-up table (LUT 1) 154 and applied to the data driver 120 can express 256 gray levels, and a full white brightness corresponds to 255 digital data MData.

In this example, the second look-up table (LUT 2) 156 converts a 6-bit digital data supplied from the multiplexer 150 into a 12-bit digital data MData having a 115 gray level information, and applies the converted digital data to the data driver 120 so as to make a gamma control as indicated by the following table:

TABLE 2

| 6-bit Digital Data (Data)-Binary Code | 12-bit Modulated Data (Mdata)-Non-binary Code |
|---|---|
| (63)111111 | 115(000111111111) |
| (62)111110 | 111(000111111011) |
| (61)111101 | 107(000111110101) |
| (60)111100 | 103(000111101101) |
| (59)111011 | 99(000111011101) |
| . | . |
| . | . |
| . | . |

Herein, the second look-up table (LUT 2) 156 converts the digital data Data into a 12-bit digital data MData, and sets (M-K) bits, most significant bits of the 12-bit digital data MData, to a value of '0' (wherein K is an integer smaller than M). For instance, when K is 9, the second LUT 156 converts the 6-bit digital data Mdata into the 12-bit digital data MData in such a manner to have a 115 gray level information without using at least 12th, 11th and 10th bits of the 12 bits. Accordingly, the 12-bit digital data MData converted by the second look-up table (LUT 2) 156 and applied to the data driver 120 can express 115 gray levels, and a full white brightness corresponds to 115 digital data MData.

Figure 6:
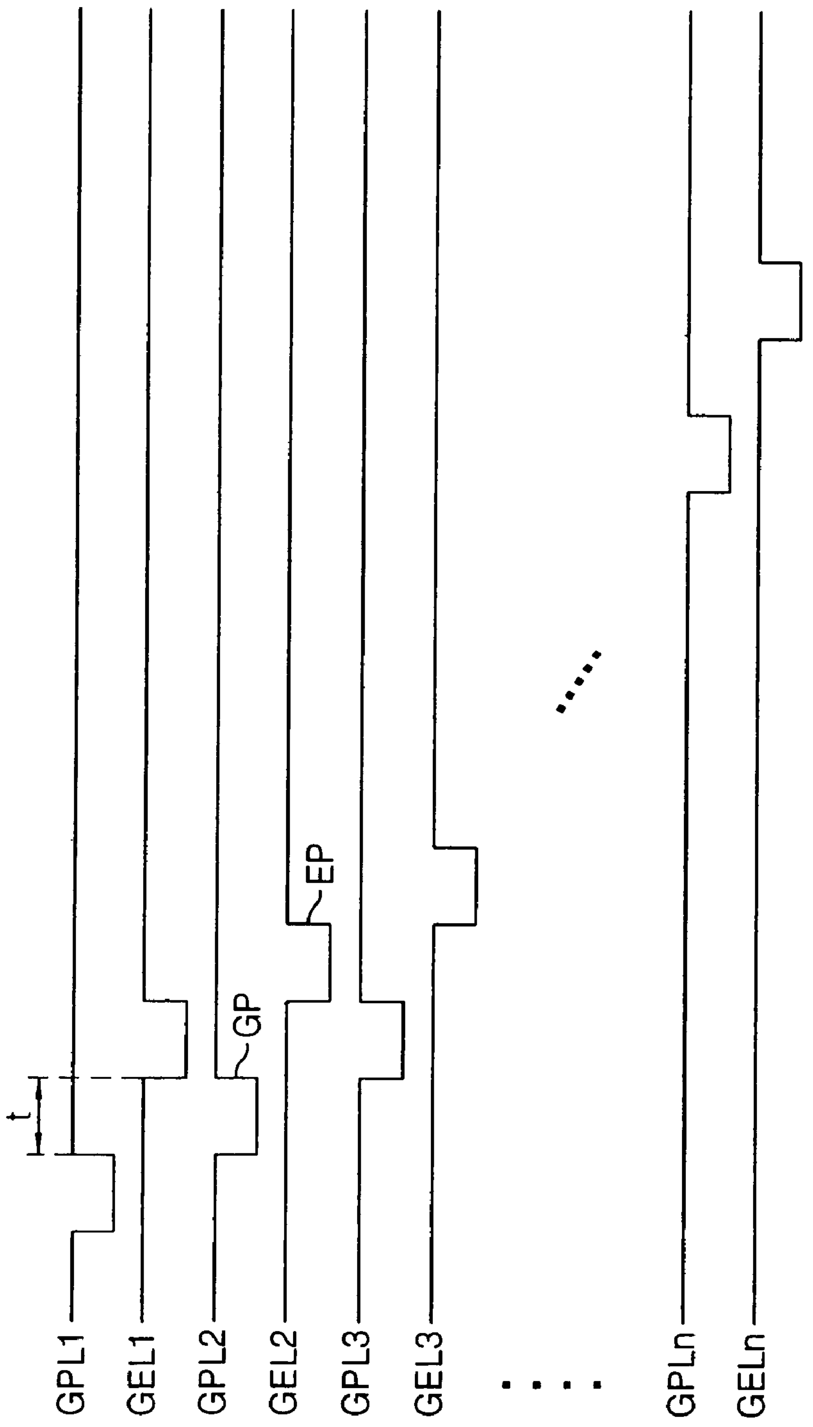
FIG. 6 is a waveform diagram of a gate pulse and an erasure pulse applied to the display gate lines and the non-display gate lines, shown in FIG. 3.

As shown in FIG. 6, the gate driver 118 generates a gate pulse GP and an erasure pulse EP in such a manner to correspond to an emission time LT of each sub-frame SF1 to SF12, which corresponds to each bit of the 12-bit digital data MData, in response to a gate control signal from the timing controller 128, and applies the gate pulse GP to the display gate lines GPL1 to GPLn to sequentially drive the display gate lines GPL1 to GPLn, while applying the erasure pulse EP to the non-display gate lines GEL1 to GELn to sequentially drive the non-display gate lines GEL1 to GELn. In this case, each sub-frame SF1 to SF12 has a predetermined time (t) difference between the gate pulse GP and the erasure pulse EP in such a manner to correspond to the emission time LT.

The data driver 120 applies a data voltage, which corresponds to the 12-bit digital data MData from the timing controller 128, to the data lines DL1 to DLm every horizontal period 1H in response to the data control signal from the timing controller 128.

Figure 7A:
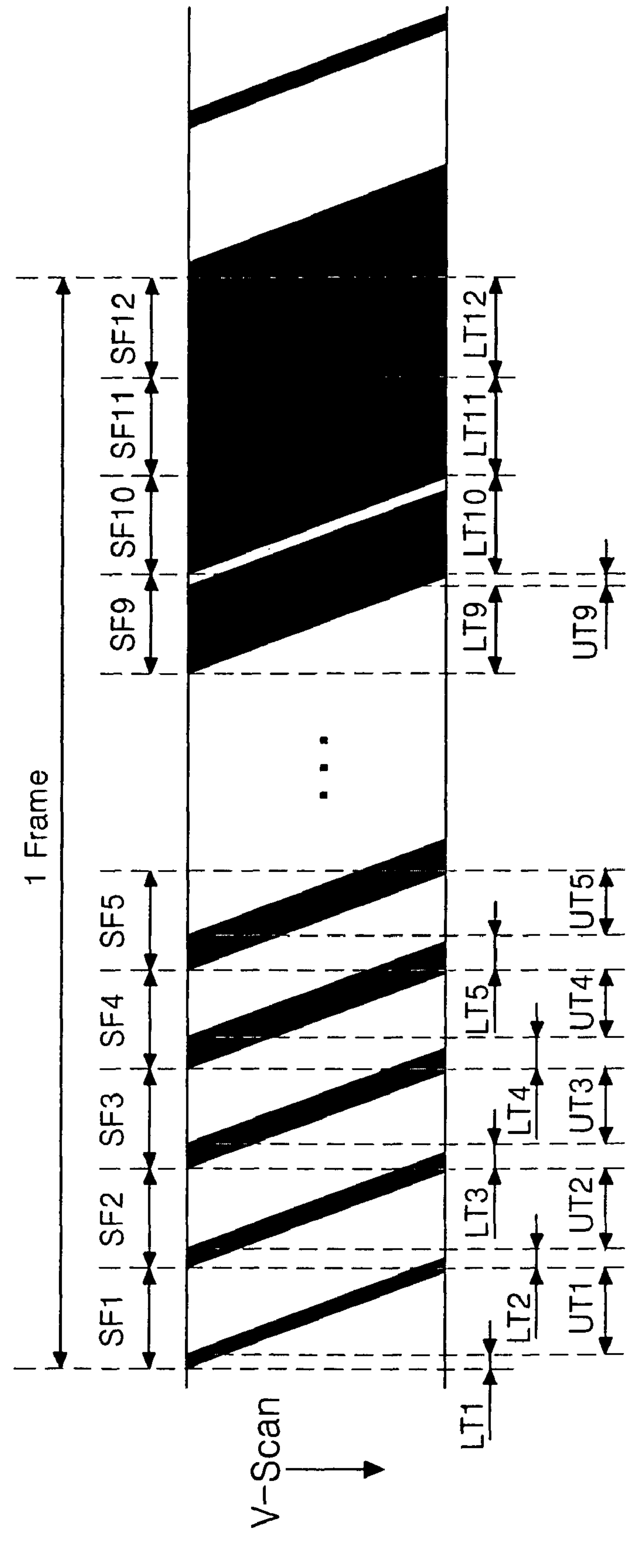
FIG. 7A illustrates a timing diagram of data in a high brightness mode made by a time divisional driving method of the electro-luminescence display device according to the first embodiment of the present invention.
Figure 7B:
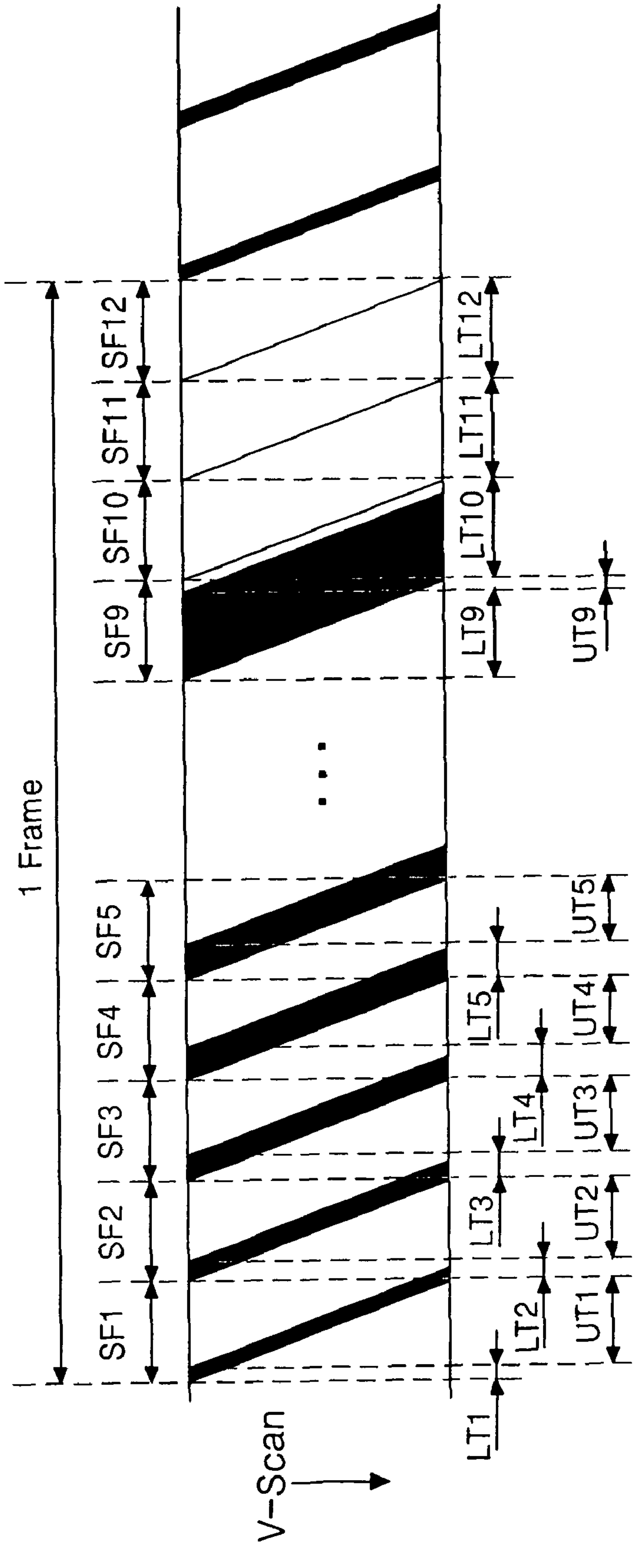
FIG. 7B illustrates a timing diagram of data in a low brightness mode made by a time divisional driving method of the electro-luminescence display device according to the first embodiment of the present invention.

As shown in FIG. 7A and FIG. 7B, the EL display device according to the first embodiment of the present invention is driven by a time divisional driving method in which each frame is divided into a plurality of sub-frames SF corresponding to each bit of a 12-bit digital data MData for gray level expression. In FIG. 7A and FIG. 7B, a 12-bit digital data MData is expressed as 256 gray levels or 115 gray levels, depending upon a brightness of the external environment of the EL display panel, and one frame is divided into 12 sub-frames SF1 to SF12 in such a manner to correspond to the 12-bit digital data Data. The first sub-frame SF1 of the 12 sub-frames SF1 to SF12 corresponds to the least significant bit of the 12-bit digital data MData, while the 12th sub-frame SF12 thereof corresponds to the most significant bit of the 12-bit digital data MData.

In addition, each of the 12 sub-frames SF1 to SF12 is divided into an emission time of LT1 to LT12 and a non-emission time of UT1 to UT12. In this case, the emission time LT1 to LT12 of each sub-frame SF1 to SF12 can use either a binary code having a ratio of 1:2:4:8:16:32: . . . or a non-binary code such as 1:2:4:6:10:14:19: . . . for expressing 256 gray levels using the 12-bit digital data MData.

During each sub-frame (SF1 to SF12) interval, the EL display device sequentially scans the entire pixels in a vertical direction, that is, in a direction from the upper portion of the EL panel to the lower portion thereof for its light-emission. Thus, the emission time LT1 to LT12 of each sub-frame (SF1 to SF12) interval follows the oblique lines shown in FIG. 7A and FIG. 7B within each sub-frame SF1 to SF12. All the emission times within each sub-frame SF1 to SF12 are summed during one frame interval to thereby express a gray level of a desired picture.

More specifically, when a brightness of the external environment of the EL display panel 116 is relatively high, the data driver 116 in the EL display device according to the first embodiment of the present invention applies a data voltage corresponding to a 12-bit digital data MData having a 256 gray level information and converted by the first look-up table (LUT 1) 154 of the timing controller 128 to the data lines DL for each sub-frame SF1 to SF12. Thus, for the high brightness mode, each pixel 122 expresses a picture with 256 gray levels by a summation of the emission time LT1 to LT12 of each sub-frame SF1 to SF12, as shown in FIG. 7A. On the other hand, when a brightness of the external environment of the EL display panel 116 is relatively low, the data driver 116 applies a data voltage corresponding to a 12-bit digital data MData having a 115 gray level information and converted by the second look-up table (LUT 2) 156 of the timing controller 128 to the data lines DL for each sub-frame SF1 to SF12. Thus, for the low brightness mode, each pixel 122 expresses a picture with 115 gray levels by a summation of the emission time LT1 to LT9 of each first to ninth sub-frame SF1 to SF9, as shown in FIG. 7B. In other words, each pixel 122 does not emit light during the 10th to 12th sub-frames SF10, SF11 and SF12 in a low brightness mode.

Such an EL display device according to the first embodiment of the present invention can display a picture in the high brightness mode or the low brightness mode, depending upon a brightness of the external environment of the EL display panel 116 without any modification of a driving time for driving the pixels 122 using the first and second look-up tables (LUT 1 and LUT 2) 154 and 156. Furthermore, the EL display device according to the first embodiment of the present invention can reduce a frame frequency due to the reduction in brightness and/or a number of the sub-frames SF depending upon a brightness of the external environment of the EL display panel 116.

Figure 8:
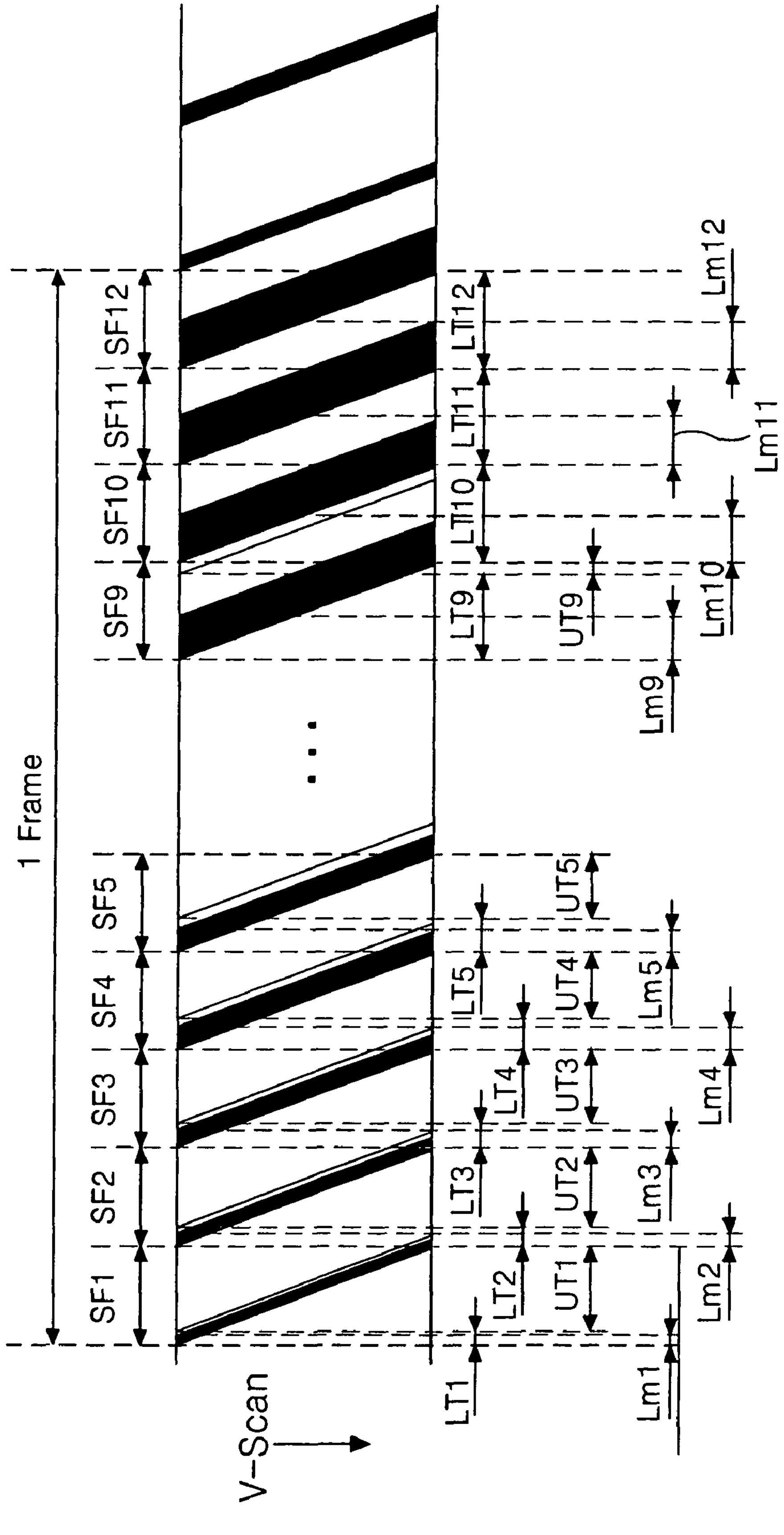
FIG. 8 illustrates a timing diagram of data made by a time divisional driving method of the electro-luminescence display device according to a second embodiment of the present invention.
Figure 9:
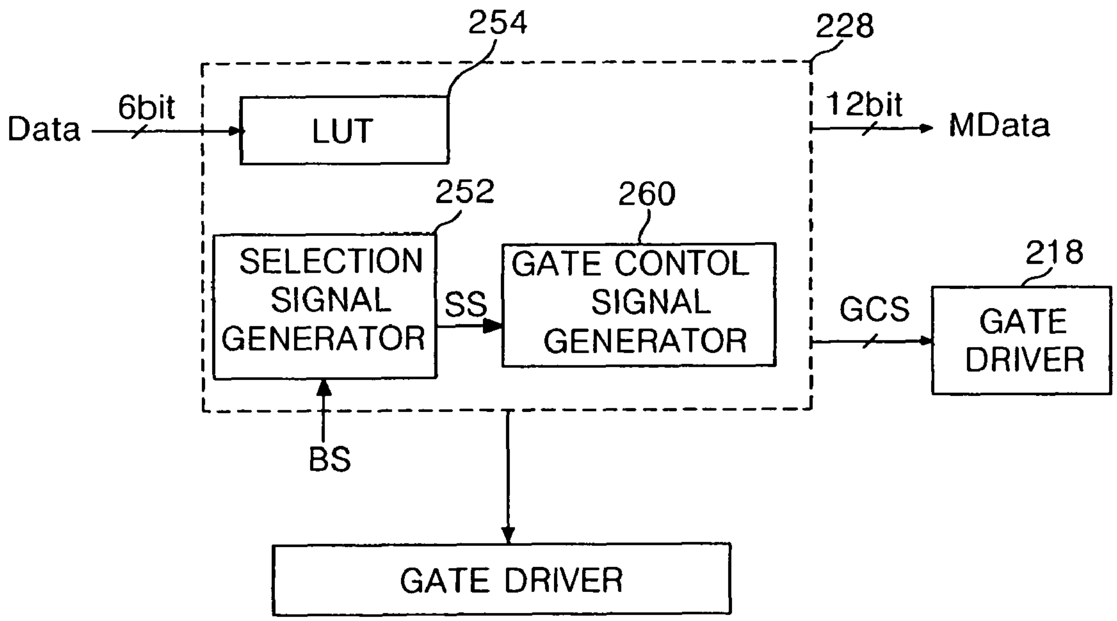
FIG. 9 is a block diagram of a timing controller of the electro-luminescence display device according to the second embodiment of the present invention.

Referring to FIGS. 8 and 9, an EL display device according to a second embodiment of the present invention reduces an emission time LT1 to LT12 of each sub-frame SF1 to SF12 depending upon a brightness of the external environment of an EL display panel 116, thereby displaying a picture in a high brightness mode or in a low brightness mode. To this end, the EL display device according to the second embodiment of the present invention has the same elements as the EL display device according to the first embodiment of the present invention shown in FIG. 3 except for a timing controller 228 and a gate driver 218. Accordingly, in the EL display device according to the second embodiment of the present invention, other elements except for the timing controller 228 and the gate driver 218 will have the same reference numerals as those in the first embodiment of the present invention, and a detailed explanation as to them will be replaced by the descriptions of the first embodiment of the present invention.

The timing controller 228 generates a data control signal for controlling the data driver 120 and a gate control signal GCS for controlling the gate driver 218 using synchronizing signals supplied from an external system (e.g. a graphic card). Further, the timing controller 228 applies a digital data Data from the external system to the data driver 120. At this time, the timing controller 228 modulates the digital data Data in response to a brightness signal BS from the photo sensor 140 and applies the modulated digital data to the data driver 120. To this end, as shown in FIG. 9, the timing controller 228 includes a selection signal generator 252 for generating a selection signal SS on the basis of the brightness signal BS from the photo sensor 140, a look-up table (LUT) 254 for converting an N-bit digital data Data inputted from the exterior thereof into an M-bit digital data MData (wherein M is an integer larger than N), and a gate control signal generator 260 for generating a gate control signal GCS either for a high brightness mode or a low brightness mode in response to the selection signal SS.

Still referring to FIG. 9, the selection signal generator 252 applies a first logical state of the selection signal SS to the gate control signal generator 260 when the brightness signal BS from the photo sensor 140 is greater than a reference value, while applying a second logical state of the selection signal SS to the gate control signal generator 260 when the brightness signal BS from the photo sensor 140 is less than the reference value. In this case, the first logical state of the selection signal SS is generated when a brightness of the external environment of the EL display panel 116 is relatively high, whereas the second logical state of the selection signal SS is generated when a brightness of the external environment of the EL display panel 116 is relatively low.

For example, the look-up table (LUT) 254 converts the 6-bit digital data Data supplied from the exterior thereof into a 12-bit digital data MData having a 256 gray level information, and applies the converted digital data to the data driver 120, as indicated by the above-mentioned table 1. Herein, the 12 bits in the look-up table (LUT) 254 have a non-binary code or a weighting value of a binary code. The second embodiment of the present invention will be described with an example of the binary code. For instance, a weighting value corresponding to each bit of the 12 bits has a ratio of 1:2:4:6:10:14:19:26:33:40:47:53. Accordingly, the 12-bit digital data MData converted by the look-up table (LUT) 254 and applied to the data driver 120 can express 256 gray levels, and a full white brightness corresponds to 255 digital data MData.

The gate control signal generator 260 generates the gate control signal GCS for generating a gate pulse GP for sequentially driving the display gate lines GPL1 to GPLn and an erasure pulse EP for sequentially driving the non-display gate lines GEL1 to GELn, and applies them to the gate driver 218. According to the second embodiment of the present invention, the emission time LT of each sub-frame SF1 to SF12 corresponding to each bit of the 12-bit digital data MData is reduced in response to the selection signal SS from the selection signal generator 252.

Figure 10:
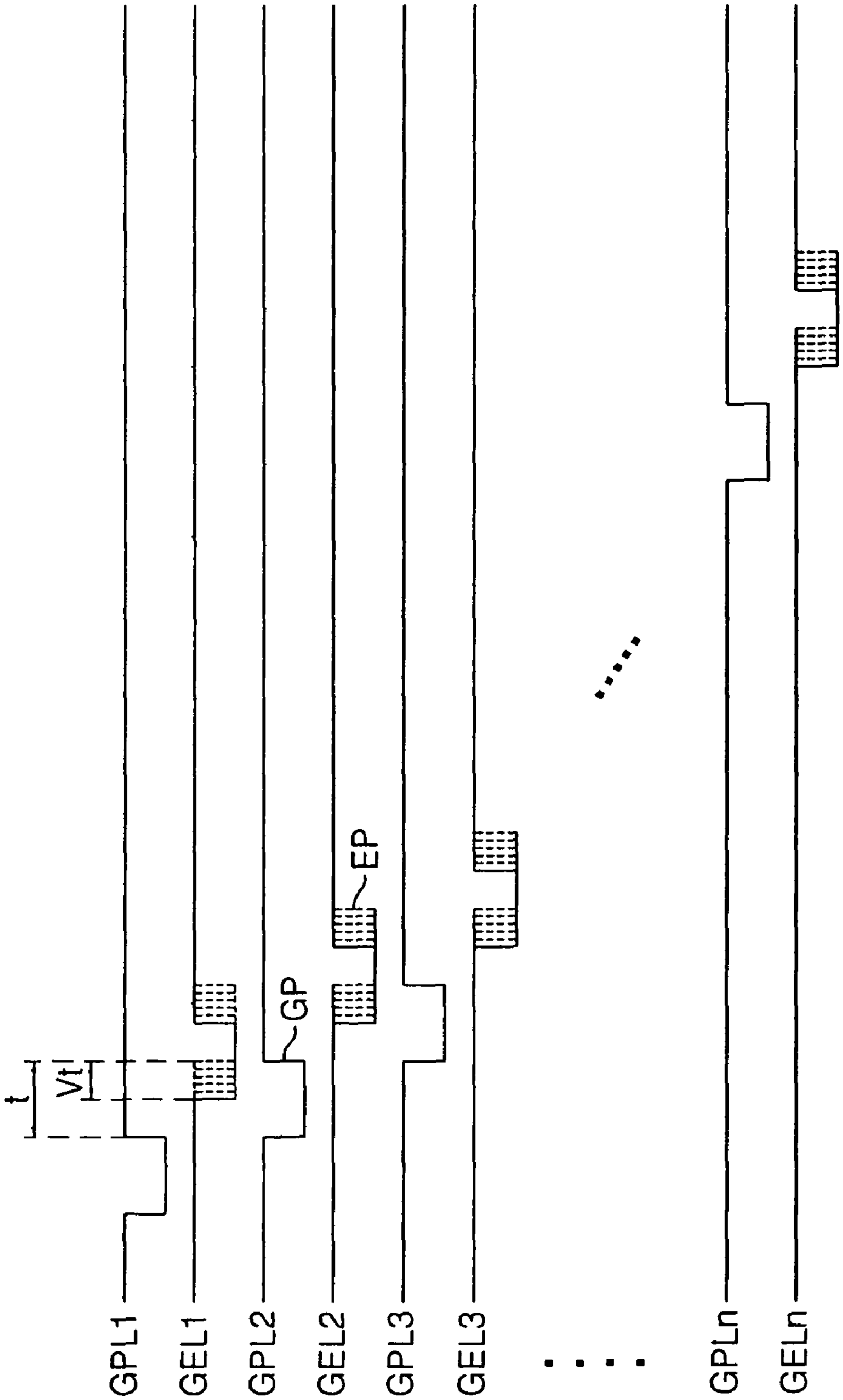
FIG. 10 is a waveform diagram of a gate pulse and an erasure pulse applied to the display gate lines and the non-display gate lines of the electro-luminescence display device according to the second embodiment of the present invention.

The gate driver 218 generates the gate pulse GP and the erasure pulse EP in such a manner to correspond to an emission time LT of each sub-frame SF1 to SF12 corresponding to each bit of the 12-bit digital data MData in response to the gate control signal GCS from the gate control signal generator 260, and applies the gate pulse GP to the display gate lines GPL1 to GPLn to sequentially drive the display gate lines GPL1 to GPLn, while applying the erasure pulse EP to the non-display gate lines GEL1 to GELn to sequentially drive the non-display gate lines GEL1 to GELn. In this case, a time difference t between the gate pulse GP and the erasure pulse EP applied to the display gate lines GPL1 to GPLn and the non-display gate lines GEL1 to GEL2, respectively, by the gate driver 218 is reduced at a certain ratio as indicated by 'Vt' in the emission time LT1 to LT12 of each sub-frame SF1 to SF12 in the low brightness mode, as illustrated in FIG. 10.

Figure 1:
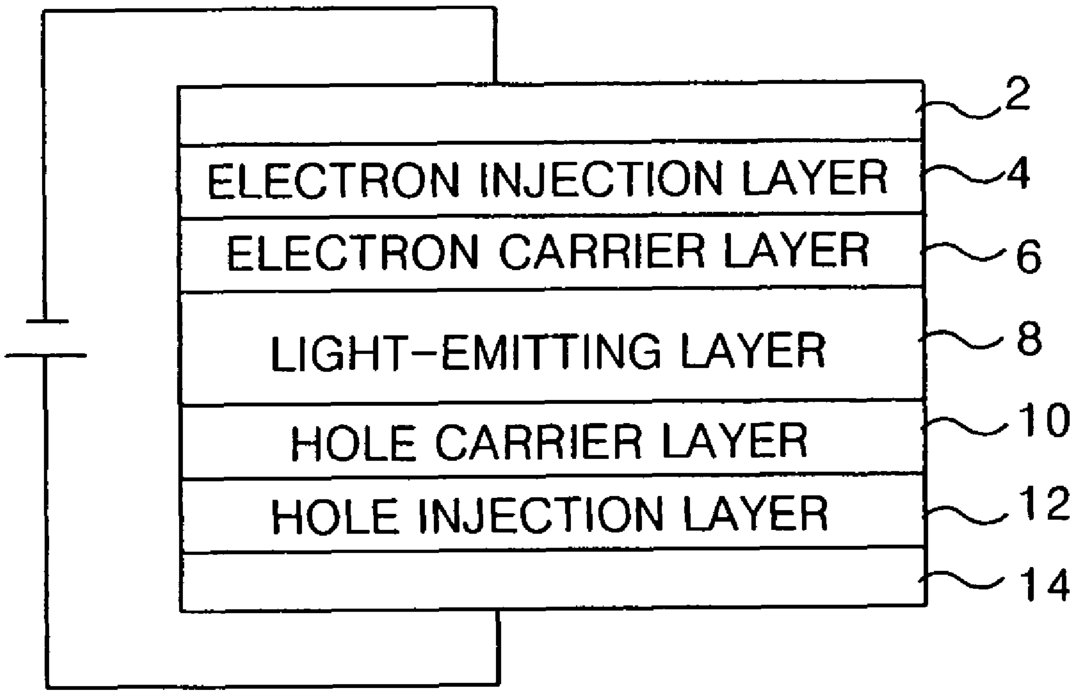
FIG. 1 RELATED ART
FIG. 1 is a schematic sectional view illustrating a general structure of an organic EL display device.
Figure 2:
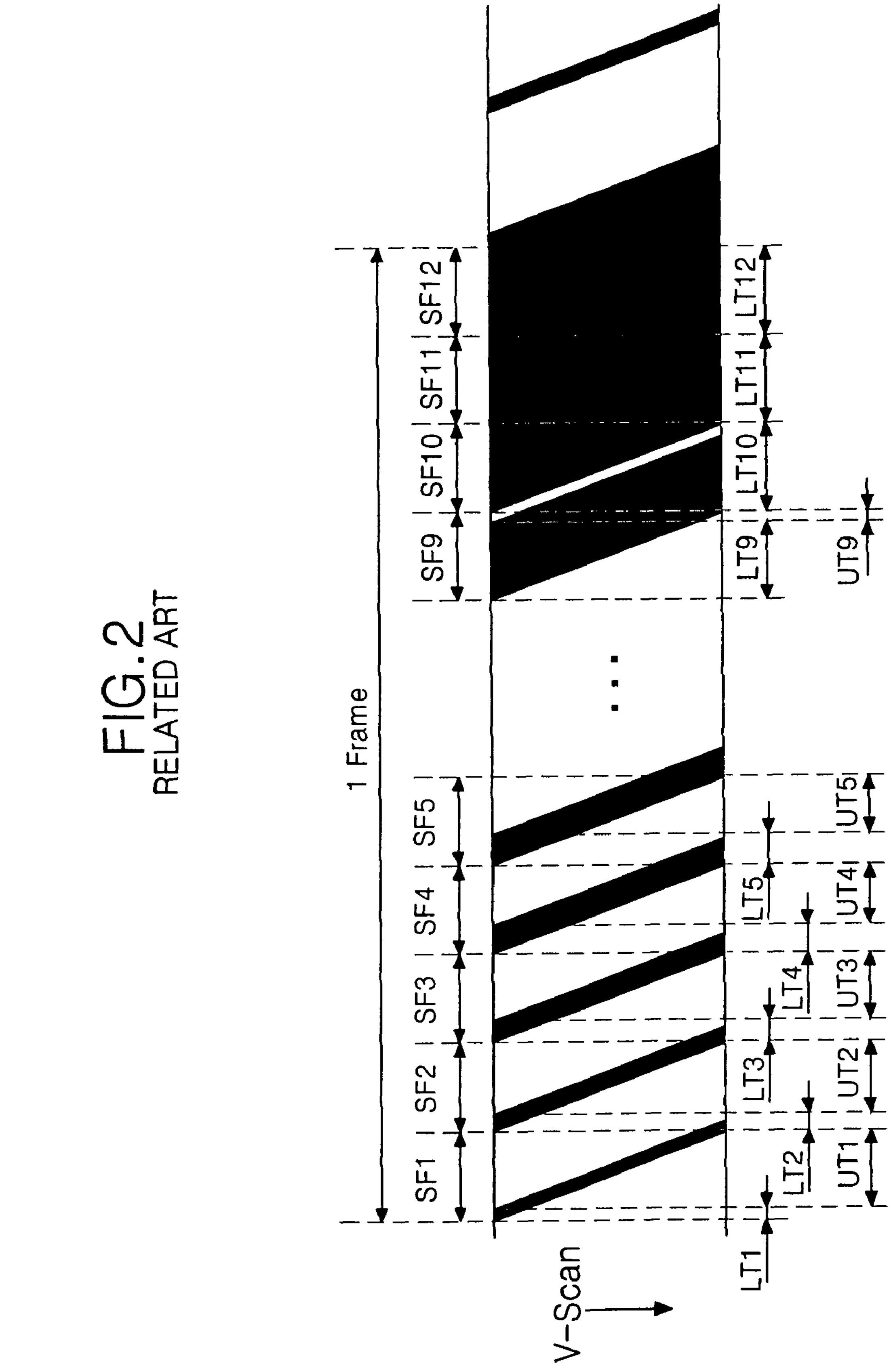
FIG.2 RELATED ART
FIG. 2 illustrates a time divisional driving method employed to drive an EL display device according to a related art.

In other words, when a brightness of the external environment of the EL display panel 116 is relatively high, the EL display device according to the second embodiment of the present invention displays a picture by a summation of the emission time LT1 to LT12 of each sub-frame SF1 to SF12 corresponding to each bit of the 12-bit digital data MData in one frame, as explained with reference to FIG. 2. On the other hand, when a brightness of the external environment of the EL display panel 116 is relatively low, the EL display device according to the second embodiment of the present invention reduces the emission time LT1 to LT12 of each sub-frame SF1 to SF12 at a certain ratio, as illustrated in FIG. 10, and displays a picture by a summation of the reduced emission time Lm1 to Lm12, as illustrated in FIG. 8. In this case, the reduced emission time Lm1 to Lm12 of each sub-frame SF1 to SF12 is reduced at a ratio of J to 1 (wherein J is an integer) with respect to the emission time LT1 to LT12 of each sub-frame SF1 to SF12 in the high brightness mode. Herein, J may be five.

As mentioned above, when the pixels 122 emit light in accordance with the emission time LT1 to LT12 of each sub-frame SF1 to SF12 corresponding to each bit of the 12-bit digital data MData in response to the brightness signal BS, the EL display panel 116 displays a picture in the high brightness mode having a 256 gray level information. On the other hand, when the pixels 122 emit light in accordance with the reduced emission time Lm1 to Lm12 of each sub-frame SF1 to SF12 corresponding to each bit of the 12-bit digital data MData in response to the brightness signal BS, the EL display panel 116 display a picture in the low brightness mode having a 115 gray level information.

Accordingly, such an EL display device according to the second embodiment of the present invention can display a picture in the high brightness mode or the low brightness mode, depending upon a brightness of the external environment of the EL display panel 116 by modifying a driving time for driving the pixels 122. Furthermore, the EL display device according to the second embodiment of the present invention can reduce brightness, depending upon a brightness of the external environment of the EL display panel 116, thereby reducing power consumption.

As described above, the EL display device and the method of driving the same according to the present invention can display a picture in the high brightness mode or in the low brightness mode by controlling a number of the sub-frames within one frame, depending upon a brightness of the external environment. The EL display device and the method of driving the same according to the present invention can also display a picture in the high brightness mode or the low brightness mode by a selection of a user. Accordingly, the EL display device according to the present invention can reduce a frame frequency owing to the reduction in brightness and/or a number of the sub-frames, depending upon a brightness of the external environment, thereby reducing power consumption. In addition, the EL display device and the method of driving the same according to the present invention can display a picture in the high brightness mode or the low brightness mode by controlling the emission time of each sub-frame within one frame, depending upon a brightness of the external environment. Accordingly, the EL display device according to the present invention can reduce brightness, depending upon a brightness of the external environment, thereby reducing power consumption.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A flat panel display device, comprising:

a display panel having a plurality of pixels;

a photo sensor detecting a brightness of the external environment of the display panel;

a timing controller receiving N-bit video signals (wherein N is an integer) and the detected brightness and dividing one frame into a plurality of sub-frames, the timing controller modulating the N-bit video signals in response to the detected brightness and the number of the sub-frames; and a data driver receiving the modulated N-bit video signals from the timing controller and applying data voltages corresponding to the modulated N-bit video signals to the pixels, wherein the timing controller includes:

a selection signal generator for generating a selection signal in response to the detected brightness from the photo sensor;

a first data converter for converting the N-bit video signals (wherein N is an integer) into a first M-bit data (wherein M is an integer larger than N);

a second data converter for converting the N-bit video signals into a second M-bit data wherein a number of gray levels of the second M-bit data are less than that of the first M-bit data; and a selector for selectively applying the N-bit video signals to any one of the first and second converters in response to the selection signal.

2. The flat panel display device according to claim 1, wherein the modulated N-bit video signals have an information on a turn-on time of the pixels during each sub-frame.

3. The flat panel display device according to claim 1, wherein the flat panel display device is an electro-luminescence display device.

4. The flat panel display device according to claim 1, wherein the second converter sets M-K bits in the most significant bits of the M-bit data are set to '0' (wherein K is an integer smaller than M).

5. The flat panel display device according to claim 4, wherein the selection signal generator generates a first logical state of selection signal when the brightness of the external environment of the display panel is relatively high while generating a second logical state of selection signal when the brightness of the external environment of the display panel is relatively low.

6. The flat panel display device according to claim 5, wherein the selection signal generator applies the N-bit video signals to the first data converter in response to the first logical state of selection signal while applying the N-bit video signals to the second data converter in response to the second logical state of selection signal.

7. The flat panel display device according to claim 4, wherein each of the first and second data converters converts the N-bit video signals into the first or second M-bit data in such a manner to have any one of a binary code and a non-binary code.

8. The flat panel display device according to claim 7, wherein a gray level value corresponding to the first M-bit data converted by the first data converter is larger than a gray level value corresponding to the second M-bit data converted by the second data converter.

9. The flat panel display device according to claim 4, wherein each of the plurality of sub-frames has a light-emission time corresponding to each bit of the first or second M-bit data.

10. The flat panel display device according to claim 1, further comprising a gate driver for sequentially driving the pixels.

11. The flat panel display device according to claim 10, wherein the timing controller includes:

a control signal generator for applying a gate control signal to the gate driver in response to the selection signal.

12. The flat panel display device according to claim 11, wherein the control signal generator applies a gate control signal to reduce a turn-on time of the pixels during each sub-frame in response to the second logical state of the selection signal.

13. The flat panel display device according to claim 12, wherein the control signal generator reduces the turn-on time of the pixels during each sub-frame by having the gate driver apply an erasure pulse to the pixels.

14. The flat panel display device according to claim 13, wherein the reduced turn-on time of the pixels during each sub-frame is reduced at a ratio of J (wherein J is an integer) in comparison with a turn-on time of the pixels when the first logical state of the selection signal is applied to the gate driver.

15. The flat panel display device according to claim 4, wherein M is 12 and N is 6.

* * * * *